Patented Oct. 5, 1954

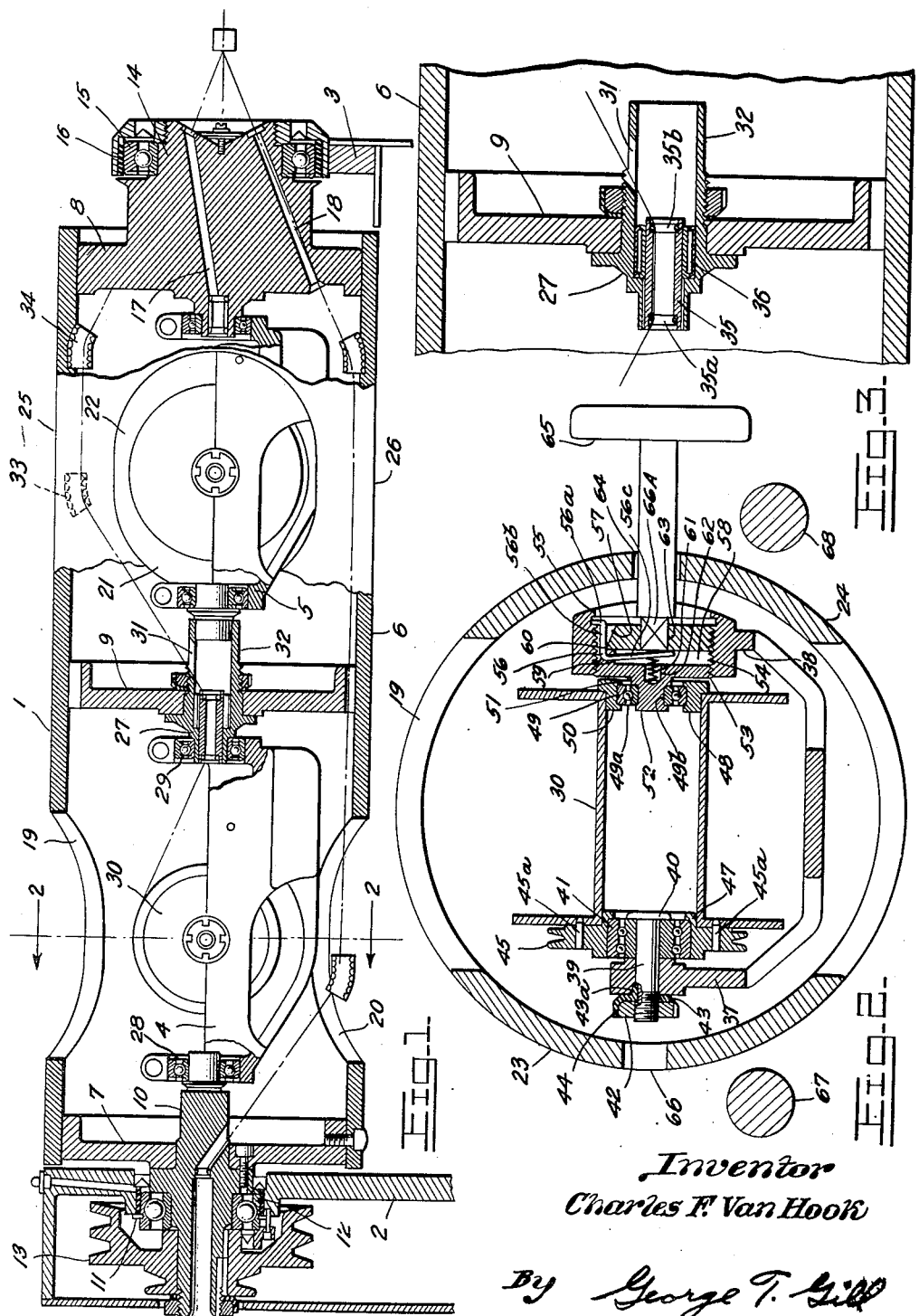

2,690,642

UNITED STATES PATENT OFFICE 2,690,642

TWISTING MACHINE

Charles F. Van Hook, Fairlawn, N. J.

Application November 20, 1948, Serial No. 61,270

7 Claims. (Cl. 57—58.34)

The invention herein disclosed relates to a twisting machine for forming, stranding, cabling, closing, laying, etc., wire rope, electric wire and cable, cordage and twines.

An object of the invention is to provide a machine of the kind mentioned that may be operated at comparatively high speed. Another object of the invention is to provide a machine of this kind in which vibration transmission is reduced to a minimum. A further object of the invention is to provide a machine of the kind mentioned in which the torsional effect on the material is reduced to a minimum. Another object of the invention is to provide, in a machine of the kind mentioned, an improved spool-carrying arrangement.

The foregoing objects and certain advantages that will hereinafter appear are realized in the embodiment of the invention illustrated in the accompanying drawing and described in detail below, from which description a clear understanding of the invention may be had.

The drawings include:

Fig. 1 which is an axial, sectional elevation of a machine embodying the invention;

Fig. 2 which is a transverse section of the same taken along the line 2—2 of Fig. 1; and Fig. 3 which is an enlarged axial section of a guide from the exit nose center of a cradle.

The particular twisting machine illustrated in the drawing is of the type in which the spools are carried along the axis of and within the rotatable body of the rotor and in which the spools are carried in cradles that do not rotate. In general, the machine illustrated includes a rotor, designated generally by the numeral 1, rotatably supported in spaced rotor supports 2 and 3; and spool-carrying cradles 4 and 5 mounted within the rotor body. While the rotor body may be considerably longer and carry a large number of spool-carrying cradles, the machine illustrated accommodates but two spool-carrying cradles. For accommodating a larger number of spool-carrying cradles, the rotor body 1 is made longer and the arrangements hereinafter described are duplicated for each additional spool-carrying cradle. In the case of a rotor body of considerable length, intermediate rotor supports are provided.

The rotor 1 includes a rotor body 6 in the form of an integral, metal cylinder, end pieces 7 and 8 secured to the cylinder, and an intermediate cradle support 9. The end piece 7 is fixed on a shaft 10 that extends therethrough. This shaft constitutes the drive shaft for the rotor and it is journaled in an end bearing 11 carried by the rotor support 2. In order to minimize the transmission of vibration from the rotor to the support, the end bearing 11 is resiliently mounted so that the vibration is absorbed. For this purpose, the bearing 11 is mounted in a resilient annular ring 12 which may be of rubber or like material and which is positioned between the bearing and the wall of the opening for the bearing in the support 2. A drive pulley 13 is keyed on the shaft and is driven by an electric motor (not shown).

The end piece 8 has an extension 14 formed thereon that is journaled in an end bearing 15 in the support 3. The end bearing 15 is also mounted in a resilient annular ring 16. The wires from the spools pass through passages 17 and 18, through the end piece 8 and extension 14, to the layhead and die (not shown) for twisting.

For mounting and removing spools from the cradles within the rotor, spool-loading openings or windows are provided through the tube or cylinder 6 of the rotor body. Heretofore, and prior to this invention, such machines have been provided with three spool-loading windows at each spool-carrying cradle. With three windows at each cradle position, the sum of the moments of inertia, of the three arched segments remaining of the cylinder at the windows remains a constant at all positions of rotation of the tube. In this way the deflection curve of the cylinder, acting as a beam between supports is a constant, and, therefore, with proper balancing of the tube stable rotation is assured. However, the maximum speed of the rotor is limited by the physical strength thereof and, particularly, the portions thereof at the spool-loading windows.

In accordance with this invention, only two, or a pair, of spool-loading windows are provided at each spool position, such as the spool-loading windows 19 and 20, at the cradle 4 and the windows 21 and 22 at the cradle 5. Successive pairs of spool-loading windows are angularly displaced about the axis of the rotor body. Thus, the windows 21 and 22 are angularly displaced about the rotor, from the position of the windows 19 and 20, through an angle of ninety degrees.

With the foregoing arrangement of spool-loading windows, the physical strength of the rotor is considerably enhanced and greatly increased speeds of rotation of the rotor are feasible. In cross-section of the rotor (Fig. 2) shows that with this arrangement, assuming the same spool-loading clearance or window size, the span bars 23 and 24, between a pair of windows, are greater than those where three windows are provided. In addition, due to the fact that the section modulus of a section varies directly with its height across its neutral axis, the greater depth of arc of the span bars results in greatly increased sectional modulii value, and consequently much higher safe operating speeds.

Successive pairs of windows are angularly spaced about the cylinder to limit the maximum deflection present at any point between supports to the minimum possible for the beam length. The span bars alongside or between the window pairs, as part of the cylinder or tube body, are, of course, a portion of the beam which the rotor body forms between supports. When the span bars are horizontal (Fig. 2), the deflection resisting section consists of two relatively long rectangles, in the vertical direction, for the chordal length of the segmental arc of each span bar is ordinarily greater than the radial depth of the arc. When the span bars are vertically, one above the other, as the span bars 25 and 26 (Fig. 1), the deflection resisting section consists of two relatively shallow arc sections of much lower moment of inertia than the first-mentioned position. Accordingly, the beam deflection resistance in the first-mentioned position is greater than in the second-mentioned position. By angularly displacing successive pairs of windows as above described, a high deflection resistance section is adjacent, along the tube, a lower deflection resistance section, thus limiting the maximum deflection present at any point between supports to the minimum possible for the beam length.

The spool-carrying cradle 4 is supported by the shaft 10 and at the nose end by a short hollow shaft or pintle 27 that extends through and is secured in an opening in the intermediate support 9. The shafts 10 and 27 are received in bearings 28 and 29 at the ends of the cradle. Due to this mounting and the form and weight of the cradle, the cradle does not rotate with the rotor body. The cradle 5 is similarly mounted.

The shaft 27 is hollow and wire or other material from a spool, such as the spool 30, is threaded through the shaft and passes through an opening 31 in the side of a hollow hub 32 on the shaft 27 to guides 33 and 34 on the rotor body and a passage through the end piece 8. A nose bushing 35 constitutes a guide for guiding the wire from the spool 30 through the exit nose center of the cradle and the intermediate support 9. The bushing is desirably provided with internal rings 35a and 35b of tungsten carbide, one at each end of the bushing. As will be seen in Fig. 3, the inner surface of the rings 35a and 35b extend inwardly beyond the inner wall of the bushing and are curved so that the wire is guided in a curve into and out of the bushing and touches only the rings.

In accordance with this invention the exit nose guide 35 is mounted in an anti-friction bearing 36 within the pintle 27, so that it is freely rotatable within the nose pintle or shaft 27. As heretofore constructed, the nose guide bushing has been either fixed with respect to the cradle and thus held stationary, or fixed with respect to the rotor body and thus caused to rotate with the rotor. In each case, the friction acting on the wire as it passed through the guide produces a torque on the wire which tends to rotate or twist the wire along its length. As the material or wire is never perfectly homogeneous, and of constant torsional property, the torsion on the wire is not removed in the same degree per unit of length and accumulates. By mounting the nose guide bushing 35 in an anti-friction bearing, I have found that the bushing rotates at a speed below that of the rotor and in accordance with the variation in the torsional roll effort of the friction between the wire and the guide bushing. This results in practically eliminating the twist or torsion in the wire and greatly improves the operation.

Another feature of the machine of this invention resides in the spool-carrying arrangement of the spool-carrying cradle. This arrangement is illustrated in Fig. 2 of the drawing. The cradle, as is usual in machines of this type, has spaced bearing arms 37 and 38 between which a spool, such as the spool 30, is received. A shaft 39 extends through an opening provided therefor in the arm 37. The shaft 39 has a head 40 on one end, the inner end thereof, and between the head 40 and the arm 37, there is mounted on the shaft an anti-friction bearing 41. The outer end of the shaft is threaded and a nut 42 threaded thereon retains the shaft in proper position and the bearing 41 clamped between the head 40 and the arm 37. A washer 43, having a key extension 43a and an extension 44 overlapping a wrench face of the nut, fixes the shaft with respect to the arm 37. Mounted on the anti-friction bearing 41, there is a pulley 45 that has formed integral therewith a pintle 47. The pulley is provided for the usual friction cable and has lateral pins 45a that extend into the side of a spool.

In the arm 38, and axially aligned with the pintle 47, there is a movable pintle 48. The pintle 48 is rotatably mounted on an anti-friction bearing 49, it being provided with inwardly extending flanges 50 and 51 for embracing the sides of the outer race 49a of the bearing 49. The inner race 49b of the bearing 49 is mounted on a reduced extension 52 of a movable pintle-carrier 53. The pintle carrier is threaded externally and is received in threaded engagement with an internally threaded opening 54 through the arm 38. The opening through the arm 38 is enlarged at the outer end thereof and an undercut, circumambient groove 55 is formed in the wall thereof.

The groove 55 cooperates with a spring pressed detent or stop lever 56 for positioning and locking the pintle 48 in spool-carrying position. The stop consists of a lever having a detent 56a, positioned to engage in the groove 55 when the pintle 48 is in spool-carrying position; an arm 56b which is received in a longitudinal, tapering groove 57 in the side of the pintle-carrier 53; and an arm 56c, extending at right angles to the arm 56b, which extends into a transverse bore 58 in the pintle carrier. The bore 58 extends to the groove or slot 57 and at the juncture thereof opposed, pivot edges 59 and 60 are formed and engage the lever 56 at the bend between the arms 56b and 56c. The lever pivots on these pivot edges. A coiled spring 61, set in a bore 62, acts on the arm 56c to bias the lever in a direction to cause the detent end 56a to engage in the groove 55.

A polygonal wrench socket 63 extends from the outer end of the pintle-carrier to the bore 58. An opening 64 is provided through the span bar 24 so that a socket wrench 65 may be inserted therethrough and into the wrench socket 63 when the loading window 19 is in loading position. A similar wrench opening 66 is provided through the span bar 23 so that the wrench may be inserted when the opening 20 is on top or in spool loading position. The end 66a of the wrench 65 is complimentary to the polygonal socket and it is of such length that when inserted to the full depth it engages the arm 56c of the detent lever 56 and withdraws the detent 56a from the groove 55. In this way, the detent is released and the pintle carrier may be retracted to remove a spool. When inserting a spool, the wrench is not inserted to its full depth so that when the detent end 66a of the lever 56 comes into alignment with the groove 55, it may, under the action of the spring 61, engage in the groove 55. All such machines have longitudinal guide rails, such as the rails 67 and 68. If the wrench should be left in place after inserting a spool and the machine started the wrench will engage the guard rail and prevent operation of the machine.

From the foregoing description of the embodiment of the invention illustrated in the drawing and described above, it will be seen that by this invention there is provided a high speed twisting machine for forming, stranding, cabling, laying etc. wire rope, electric wire and cable, cordage and twine.

It will be obvious that various changes may be made by those skilled in the art in the details of the embodiment of the invention illustrated in the drawing and described above within the principle and scope of the invention as expressed in the appended claims.

I claim:

1. In a twisting machine, the combination comprising a spool-carrying cradle, a pair of opposed spool-carrying pintles carried by said cradle, one of said pintles being movable longitudinally of the pintle axis into and out of spool-engaging position, wrenching faces for effecting engagement with a wrench to effect movement of the pintle, and releasable means for retaining said movable pintle in spool-engaging position, said releasable means being released upon full engagement of the wrenching faces by a wrench.

2. In a twisting machine, the combination comprising a spool-carrying cradle, a pair of opposed spool-carrying pintles carried by said cradle, one of said pintles being movable longitudinally of the pintle axis into and out of spool-engaging position and having a wrench opening therein, and releasable means for retaining said movable pintle in spool-engaging position and positioned to be engaged and released by a wrench inserted in said wrench opening.

3. In a twisting machine, the combination comprising a rotatably mounted rotor body, a stationary guard rail extending longitudinally of said rotor body, a spool-carrying cradle within the rotor body, opposed spool-carrying pintles carried by the cradle, one of said pintles being movable longitudinally of the pintle axis into and out of spool-engaging position, the rotor body having a wrench-receiving opening therethrough adapted to be aligned with said movable pintle.

4. In a twisting machine of the kind described, the combination comprising a rotor body, a spool-carrying cradle mounted in the rotor body to remain stationary while the rotor body rotates, and an exit nose guide freely rotatable with respect to the cradle and the rotor body about the axis of rotation of the rotor body.

5. In a twisting machine of the kind described, the combination comprising a rotor body, a spool-carrying cradle mounted in the rotor body to remain stationary while the rotor body rotates and including a hollow exit nose pintle, and an exit nose guide freely rotatable within the exit nose pintle about the axis of the pintle.

6. In a twisting machine of the kind described, the combination comprising a rotor body, a spool carrying cradle mounted in the rotor body to remain stationary while the rotor body rotates and including a hollow exit nose pintle and a freely rotatable nose guide in and concentric with the rotor body and cradle axis.

7. In a twisting machine, the combination comprising a rotatably mounted rotor body, a stationary guard rail extending longitudinally of said rotor body, a spool-carrying cradle within the rotor body, opposed spool-carrying pintles carried by the cradle, one of said pintles being movable longitudinally of the pintle axis into and out of spool-engaging position, wrenching faces for effecting engagement with a wrench to effect movement of the pintle, the rotor body having a wrench receiving opening therethrough adapted to be aligned with said movable pintle, and releasable means for retaining said movable pintle in spool-engaging position, said releasable means being released upon engagement of the wrenching faces of the movable pintle by a wrench.

References Cited in the file of this patent

UNITED STATES PATENTS

| Number | Name | Date |
|---|---|---|
| 1,218,009 | Somerville | Mar. 6, 1917 |
| 1,458,997 | Sleeper | June 19, 1923 |
| 2,004,634 | Petterson | June 11, 1935 |
| 2,177,812 | Robbins et al. | Oct. 31, 1939 |
| 2,277,102 | Henning et al. | Mar. 24, 1942 |
| 2,379,806 | Kent | July 3, 1945 |
| 2,416,126 | Sommerville | Feb. 18, 1947 |
| 2,452,255 | McKosky | Oct. 26, 1948 |
| 2,477,690 | French | Aug. 2, 1949 |

FOREIGN PATENTS

| Number | Country | Date |
|---|---|---|
| 17,733 | Great Britain | of 1912 |